(12) United States Patent
Kang et al.

(10) Patent No.: US 12,301,273 B2
(45) Date of Patent: May 13, 2025

(54) COVER FOR FOLDABLE ELECTRONIC DEVICE INCLUDING PEN HOLDER

(71) Applicant: SAMSUNG ELECTRONICS CO., LTD., Suwon-si (KR)

(72) Inventors: Bosoon Kang, Suwon-si (KR); Kangmoon Kim, Suwon-si (KR); Namsu Kim, Suwon-si (KR); Jieun Myung, Suwon-si (KR); Dahyun Lee, Suwon-si (KR); Junwon Lee, Suwon-si (KR); Jinhoo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 476 days.

(21) Appl. No.: 17/882,008

(22) Filed: Aug. 5, 2022

(65) Prior Publication Data
US 2023/0037484 A1 Feb. 9, 2023

Related U.S. Application Data

(63) Continuation of application No. PCT/KR2022/011178, filed on Jul. 29, 2022.

(30) Foreign Application Priority Data

Aug. 6, 2021 (KR) .................. 10-2021-0104115

(51) Int. Cl.
*H04B 1/3888* (2015.01)
*G06F 3/0354* (2013.01)
*G09F 9/30* (2006.01)

(52) U.S. Cl.
CPC ....... *H04B 1/3888* (2013.01); *G06F 3/03545* (2013.01); *G09F 9/301* (2013.01)

(58) Field of Classification Search
CPC ... H04B 1/3888; A45C 11/00; A45C 2200/15; A45C 2011/002; A45C 2011/003; H04M 1/0202; H04M 1/21; H04M 1/185
See application file for complete search history.

(56) References Cited

U.S. PATENT DOCUMENTS 7,474,525 B2  1/2009  Watanabe et al.
9,327,544 B2  5/2016  Ceruzzi
(Continued)

FOREIGN PATENT DOCUMENTS

CN  210573497  5/2020
CN  213043730  4/2021
(Continued)

OTHER PUBLICATIONS

Extended European Search Report dated Aug. 6, 2024 issued in European Patent Application No. 22853364.2.
(Continued)

*Primary Examiner* — Cindy Trandai
(74) *Attorney, Agent, or Firm* — Nixon & Vanderhye, P.C.

(57) ABSTRACT

Disclosed is a cover for a foldable electronic device. The cover includes: a first cover portion configured to be coupled to a first housing of the electronic device, a second cover portion configured to be coupled to a second housing of the electronic device, a connecting portion provided between the first cover portion and the second cover portion and extending in a first direction, the connecting portion being configured such that the first cover portion and the second cover portion are folded to be superimposed on each other or are unfolded, and a pen holder configured to at least partially accommodate a pen and mounted on the connecting portion to be detachable.

18 Claims, 12 Drawing Sheets

(56) References Cited

U.S. PATENT DOCUMENTS

| | | | |
|---|---|---|---|
| 9,971,379 B2 | 5/2018 | Griffin, II et al. | |
| 10,198,090 B2 | 2/2019 | Maeshima | |
| 10,688,756 B2 | 6/2020 | Chu et al. | |
| 10,850,023 B2 | 12/2020 | Bihn | |
| 10,892,625 B1 * | 1/2021 | Franklin | A45C 11/00 |
| 10,974,487 B2 | 4/2021 | Chu et al. | |
| 11,068,023 B1 | 7/2021 | Manzano et al. | |
| 11,452,311 B1 * | 9/2022 | Johns | A24F 15/01 |
| D984,428 S * | 4/2023 | Myung | D14/250 |
| D986,871 S * | 5/2023 | Kim | D14/250 |
| 11,870,481 B1 * | 1/2024 | Huang | H04B 1/3888 |
| 2015/0177838 A1 * | 6/2015 | Bae | G06F 1/1692 |
| | | | 345/173 |
| 2017/0060180 A1 | 3/2017 | Griffin, II et al. | |
| 2017/0097698 A1 | 4/2017 | Maeshima | |
| 2017/0232184 A1 | 8/2017 | Bihn | |
| 2018/0314349 A1 * | 11/2018 | Jiang | H02J 50/005 |
| 2019/0022980 A1 | 1/2019 | Chu et al. | |
| 2021/0206145 A1 | 7/2021 | Chu et al. | |
| 2021/0288687 A1 * | 9/2021 | Novak | H04B 1/3888 |
| 2022/0142315 A1 | 5/2022 | Wang | |
| 2023/0361799 A1 * | 11/2023 | Xie | H04B 1/3888 |

FOREIGN PATENT DOCUMENTS

| | | |
|---|---|---|
| JP | 2004-030096 | 1/2004 |
| JP | 2013-236729 | 11/2013 |
| JP | 2018-013969 | 1/2018 |
| JP | 3225411 | 3/2020 |
| KR | 10-1331174 | 11/2013 |
| KR | 10-2016-0112145 | 9/2016 |
| KR | 10-2021-0014252 | 2/2021 |
| KR | 10-2021-0067707 | 6/2021 |

OTHER PUBLICATIONS

Search Report dated Nov. 18, 2022 issued in International Patent Application No. PCT/KR2022/011178.

* cited by examiner

COVER FOR FOLDABLE ELECTRONIC DEVICE INCLUDING PEN HOLDER

CROSS-REFERENCE TO RELATED APPLICATIONS

This application is a continuation of International Application No. PCT/KR2022/011178 designating the United States, filed on Jul. 29, 2022, in the Korean Intellectual Property Receiving Office and claiming priority to Korean Patent Application No. 10-2021-0104115, filed on Aug. 6, 2021, in the Korean Intellectual Property Office, the disclosures of which are incorporated by reference herein in their entireties.

BACKGROUND

1. Field

The disclosure relates to a cover for a foldable electronic device that includes a pen holder.

2. Description of Related Art

A foldable electronic device may include a flexible display having a partial area deformable to be flat or curved. The foldable electronic device may include a first housing on one side of a bending area of the flexible display and a second housing on an opposite side of the bending area of the flexible display. The foldable electronic device may include a hinge structure that connects the first housing and the second housing such that the first housing and the second housing are foldable and a hinge housing that covers the hinge structure. The foldable electronic device may include a pen as an input device. The foldable electronic device may include a pen holder having a pen storage space formed therein.

The above information is presented as background information only to assist with an understanding of the disclosure. No determination has been made, and no assertion is made, as to whether any of the above might be applicable as prior art with regard to the disclosure.

SUMMARY

Embodiments of the disclosure provide a protective cover for a foldable electronic device from which a pen and a pen holder are detachable and that supports folding and unfolding motions of the foldable electronic device.

A cover for an electronic device according to an example embodiment of the disclosure includes: a first cover portion configured to be coupled to a first housing of the electronic device, a second cover portion configured to be coupled to a second housing of the electronic device, a connecting portion provided between the first cover portion and the second cover portion and extending in a first direction, the connecting portion being configured such that the first cover portion and the second cover portion are folded to be superimposed on each other or are unfolded, and a pen holder configured to at least partially accommodate a pen and mounted on the connecting portion to be detachable.

The cover for the foldable electronic device according to various example embodiments of the disclosure may include the guide rail and the pen holder slidably coupled to the guide rail. Accordingly, the pen holder may be easily attached and detached depending on a user's selection. Furthermore, the pen holder may be configured such that the pen is stored therein. Accordingly, depending on the user's selection, the pen may be removed alone, or the pen and the pen holder may be removed together.

In addition, the disclosure may provide various effects that are directly or indirectly recognized.

BRIEF DESCRIPTION OF THE DRAWINGS

The above and other aspects, features and advantages of certain embodiments of the present disclosure will be more apparent from the following detailed description, taken in conjunction with the accompanying drawings, in which.

With regard to description of the drawings, identical or similar reference numerals may be used to refer to identical or similar components.

DETAILED DESCRIPTION

Hereinafter, various example embodiments of the disclosure may be described with reference to accompanying drawings. Accordingly, those of ordinary skill in the art will recognize that various modifications, equivalents, and/or alternatives on the various example embodiments described herein can be variously made without departing from the scope and spirit of the disclosure.

Figure 1:
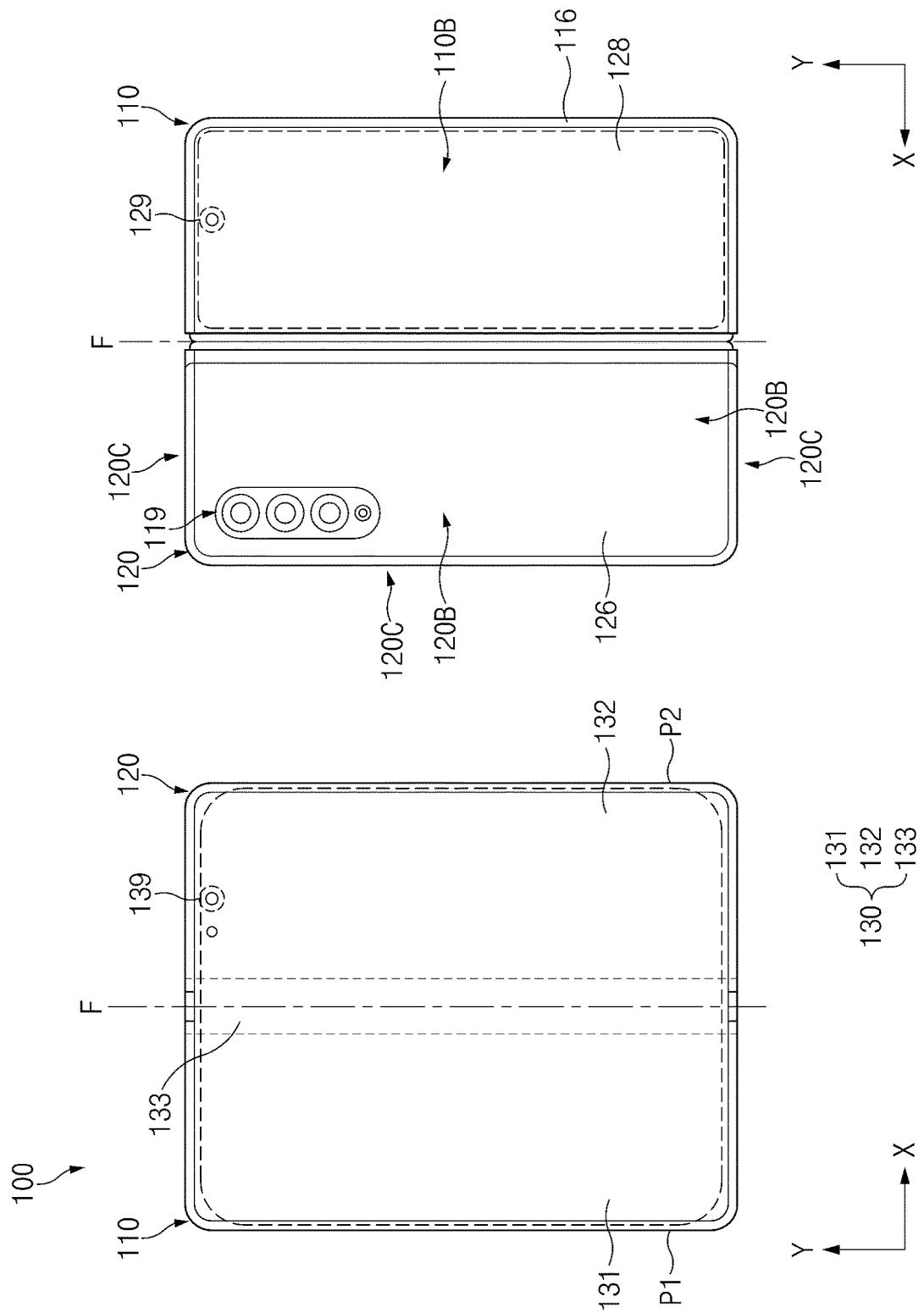
FIG. 1 is a diagram illustrating an example foldable electronic device in an unfolded (e.g., flat) state according to various embodiments.

FIG. 1 is a diagram illustrating an example foldable electronic device in an unfolded (e.g., flat) state according to various embodiments. FIG. 1 is a view illustrating the foldable electronic device to which a cover for the foldable electronic device is coupled according various embodiments.

Figure 2:
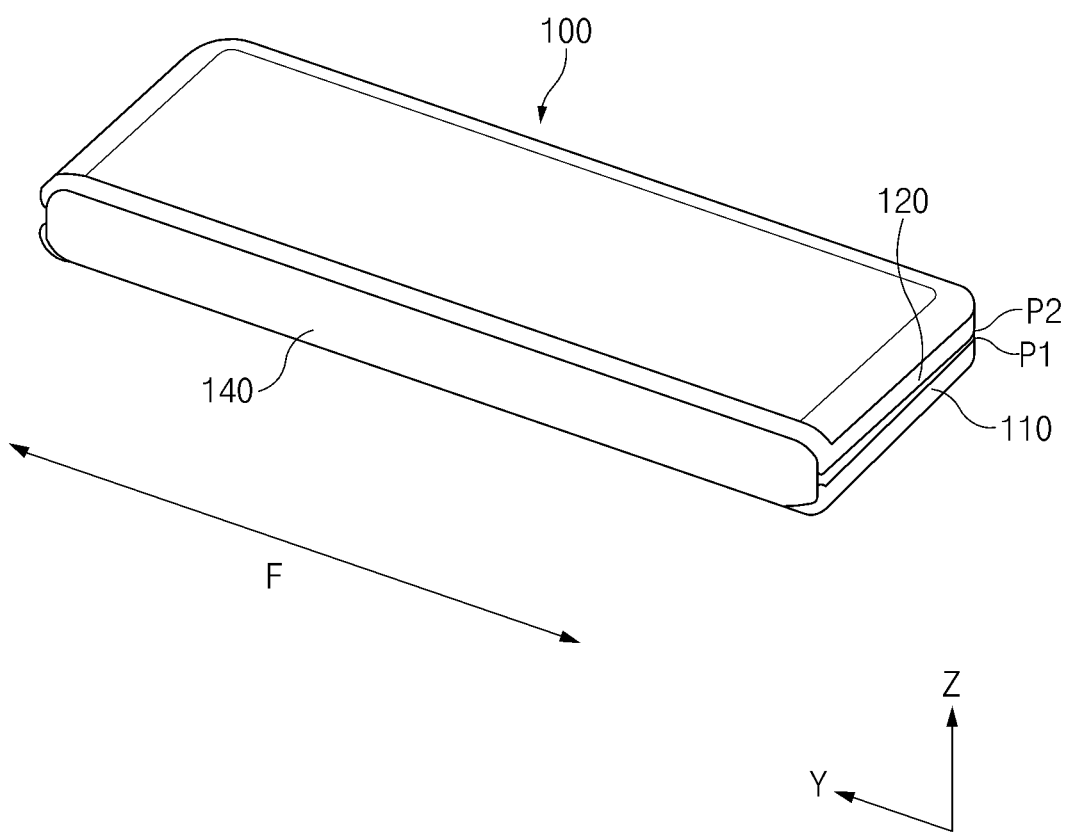
FIG. 2 is a perspective view illustrating an example foldable electronic device in a folded state according to various embodiments.

FIG. 2 is a perspective view illustrating the foldable electronic device in a folded state according to various embodiments. FIG. 2 is a view illustrating the foldable electronic device to which the cover for the foldable electronic device is coupled according to various embodiments.

In an embodiment, the foldable electronic device 100 (hereinafter, referred to as the electronic device 100) may include a first housing 110, a second housing 120, a hinge housing 140, and a display 130.

In an embodiment, the first housing 110 and the second housing 120 may be folded or unfolded with a folding axis F therebetween. For example, the first housing 110 and the second housing 120 may be configured to rotate in opposite directions about axes of rotation parallel to the folding axis F, respectively. In a folding motion from the flat state of FIG. 1 to the folded state of FIG. 2, the first housing 110 may rotate in the clockwise direction, and the second housing 120 may rotate in the counterclockwise direction.

Referring to FIGS. 1 and 2, the hinge housing 140 may be disposed between the first housing 110 and the second housing 120. In the flat state, the hinge housing 140 may be hidden by the first housing 110 and the second housing 120, and in the folded state, the hinge housing 140 may be exposed to the outside. The hinge housing 140 may have a shape extending in the y-axis direction as a whole. The hinge housing 140 may have a hinge structure (not illustrated) disposed therein for rotating the first housing 110 and the second housing 120.

In an embodiment, the display 130 may be provided to be at least partially flexible. In an embodiment, the display 130 may include a first area 131 and a second area 132 that are flat in the flat state and the folded state, and a folding area 133 that is curved in the folded state and flat in the flat state. The first area 131 may be at least partially disposed in the first housing 110, and the second area 132 may be at least partially disposed in the second housing 120. The folding area 133 may be defined between the first area 131 and the second area 132. The folding area 133 may be deformed to be flat or curved in a folding or unfolding motion of the electronic device 100.

Referring to FIG. 1, the electronic device 100 may include camera modules 139 and 129. The camera modules 139 and 129 may be disposed under the display 130. For example, referring to FIG. 1, the first camera module 139 may include a punch hole camera module disposed under the second area 132. For example, the second camera module 129 may include a punch hole camera module disposed under a sub-display 128.

Referring to FIG. 1, the first housing 110 may include a first back cover 116 that forms a rear surface 110B in the flat state. The sub-display 128 may be disposed on the first back cover 116. Referring to FIG. 1, the second housing 120 may include a second back cover 126 that forms a rear surface 120B in the flat state. A third camera module 119 may be disposed on the second back cover 126.

To describe a state of the electronic device 100, a first edge P1 of the electronic device 100 and a second edge P2 of the electronic device 100 that are parallel to the folding axis F may be defined.

The flat state of the electronic device 100 will be described below with reference to FIG. 1. The flat state may include the state in which the folding area 133 of the display 130 is flat. For example, the flat state may include the state in which the first area 131 and the second area 132 of the display 130 are flat to face the same direction. For example, the flat state may include the state in which the first normal vector of the first area 131 and the second normal vector of the second area 132 of the display 130 are parallel to each other.

The folded state of the electronic device 100 will be described below with reference to FIG. 2. For example, the folded state may refer to the state in which the first edge P1 and the second edge P2 substantially make contact with each other. For example, the folding area 133 in the folded state may be curved. In the folded state, the hinge housing 140 may form at least a portion of a surface of the electronic device 100. For example, the hinge housing 140 may be visually exposed between the first housing 110 and the second housing 120.

Figure 3:
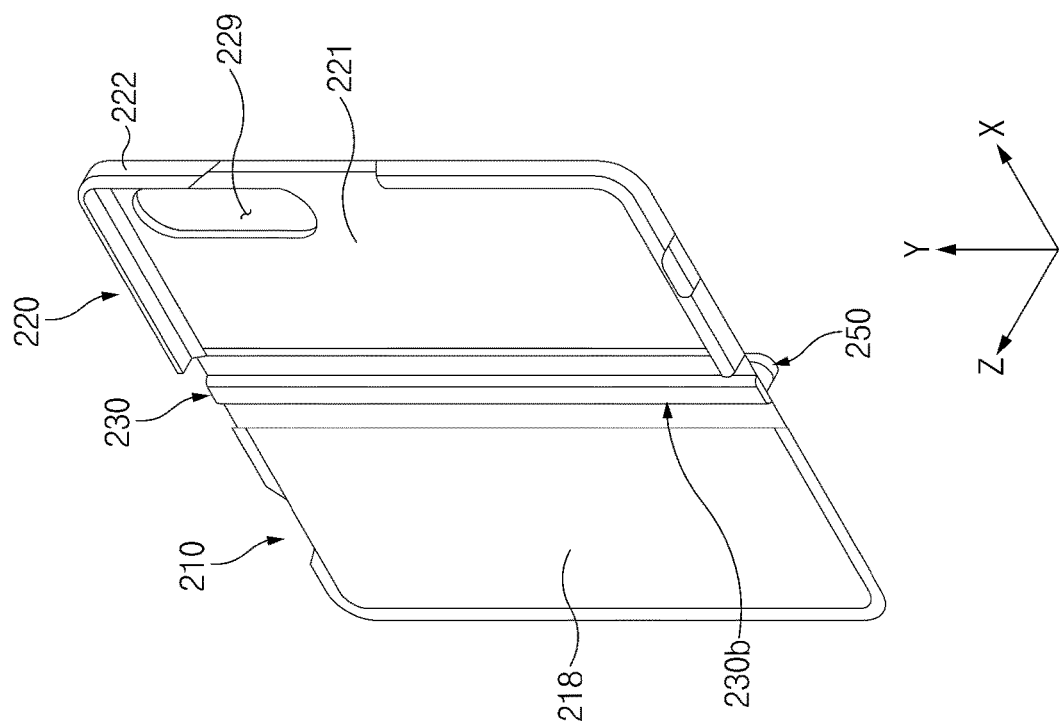
FIG. 3 is a perspective view illustrating a cover including a pen holder for the foldable electronic device according to various embodiments.
Figure 3:
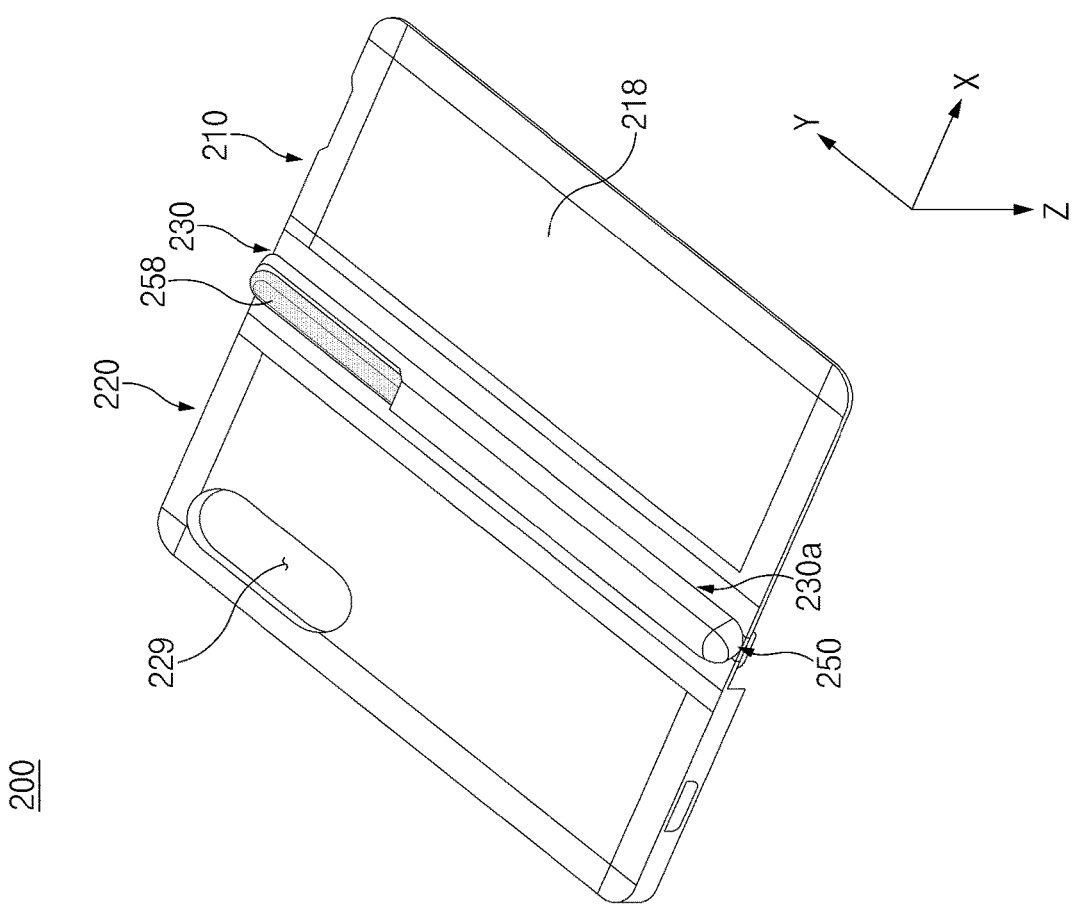
Figure 4:
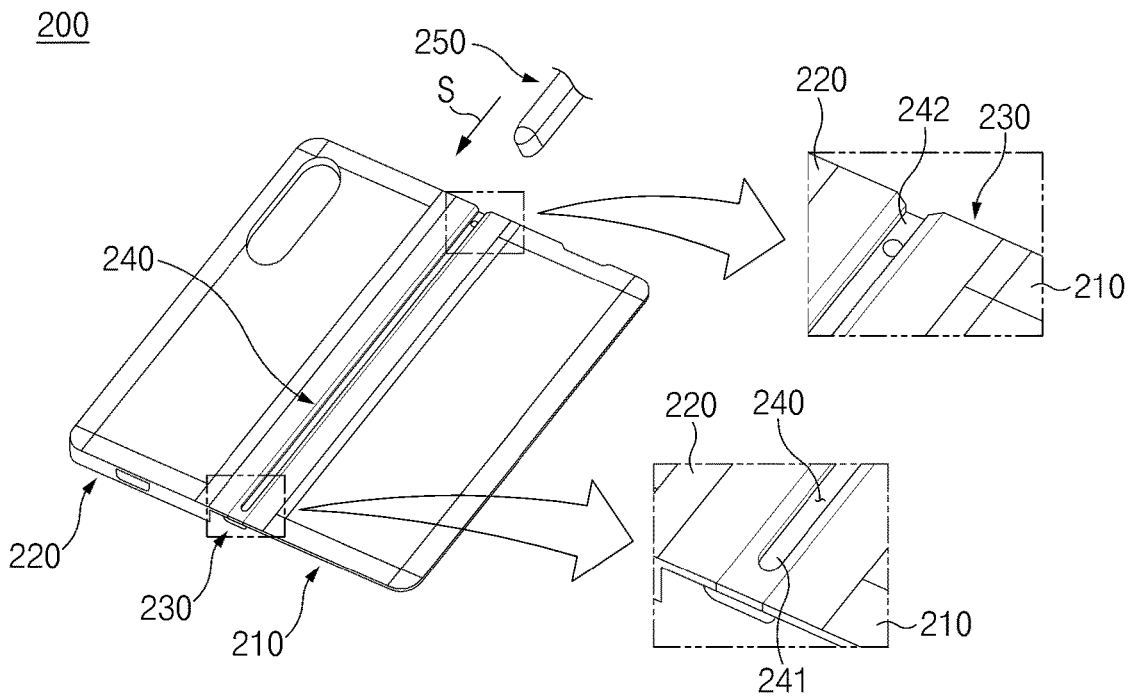
FIG. 4 is a perspective view illustrating the cover for the foldable electronic device including a pen holder according to various embodiments.
Figure 4:
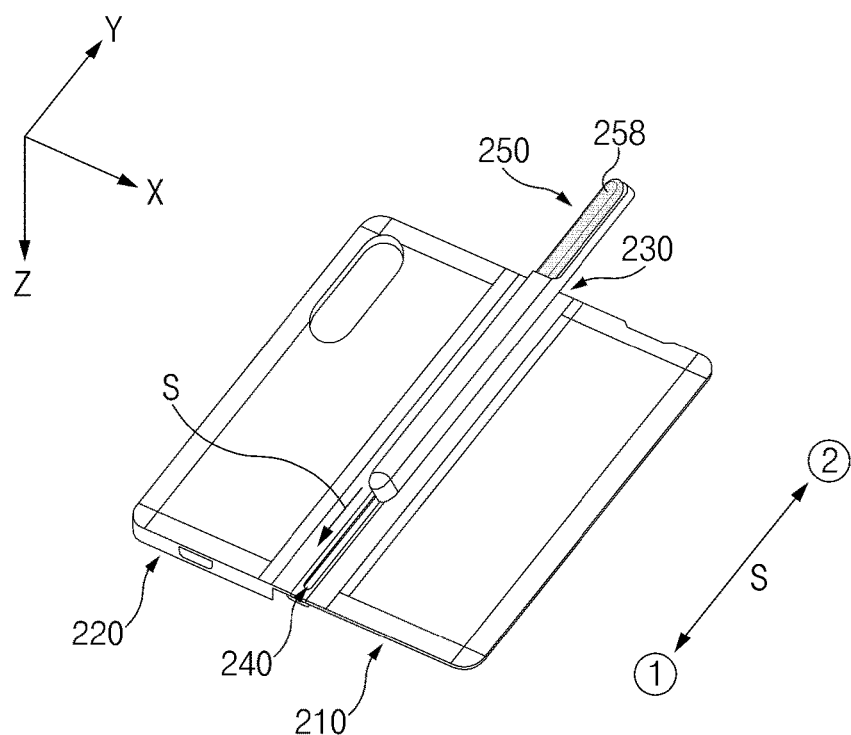

FIGS. 3 and 4 are perspective views illustrating a cover including a pen holder for the foldable electronic device (hereinafter, referred to as the cover), according to various embodiments.

Referring to FIGS. 3 and 4, the cover 200 may include a first cover portion 210 coupled to the first housing 110 of the electronic device 100, a second cover portion 220 coupled to the second housing 120 of the electronic device 100, a connecting portion 230 connecting the first cover portion 210 and the second cover portion 220, and the pen holder 250.

In an embodiment, the first cover portion 210 may be provided to surround at least a portion of the first housing 110 of the electronic device 100. The first cover portion 210 may be coupled to the first housing 110 to cover at least a portion of the rear surface 110B of the first housing 110. For example, the first cover portion 210 may at least partially cover the first back cover 116 of the first housing 110. For example, the first cover portion 210 may include a display area 218 through which the sub-display 128 is visible. The display area 228 may include a transparent area. The first cover portion 210 may face a first area 221 of the second cover portion 220 by bending of the connecting portion 230, or may be unfolded to form substantially the same plane with the first area 221 of the second cover portion 220.

In an embodiment, the second cover portion 220 may be provided to surround at least a portion of the second housing 120 of the electronic device 100. For example, the second cover portion 220 may be coupled to the second housing 120 to cover at least portions of the rear surface 120B and the side surface 120C of the second housing 120. For example, the second cover portion 220 may at least partially cover the second back cover 126 of the second housing 120. In an embodiment, the second cover portion 220 may include the first area 221 that covers at least a portion of the rear surface 120B of the second housing 120 and a second area 222 that covers at least a portion of the side surface 120C of the second housing 120. The second area 222 may extend from at least a portion of the periphery of the first area 221. The first area 221 may at least partially make contact with the second back cover 126 of the second housing 120.

In an embodiment, an opening area 229 corresponding to a camera module (e.g., the camera module 119) of the electronic device 100 may be formed in the second cover portion 220. Referring to the drawings, the opening area 229 may be formed in the first area 221 of the second cover portion 220. However, the opening area 229 may be formed in the first area 221 and/or the second area 222 of the second cover portion 220 depending on the positions of various modules provided in the electronic device 100.

In an embodiment, the first cover portion 210 and the second cover portion 220 may be folded or unfolded with the folding axis F therebetween. In an embodiment, a flat state and a folded state of the cover 200 may be defined by a flat state and a folded state of the electronic device 100. For example, the flat state may include the state in which the first cover portion 210 and the first area 221 of the second cover portion 220 form substantially the same plane. For example, FIGS. 3 and 4 illustrate the cover 200 in the flat state. The folded state may include the state in which the first cover portion 210 at least partially makes contact with the second area 222 of the second cover portion 220.

In an embodiment, the connecting portion 230 may be defined between the first cover portion 210 and the second cover portion 220 and may connect the first cover portion 210 and the second cover portion 220. For example, the connecting portion 230 may be configured such that the first cover portion 210 and the second cover portion 220 are folded toward each other or unfolded away from each other. The connecting portion 230 may be configured to be at least partially flexible. The connecting portion 230 may be bent depending on a folding or unfolding motion of the electronic device 100. As the connecting portion 230 is bent, the first cover portion 210 and the second cover portion 220 may be folded or unfolded. In an embodiment, in a folded state, the connecting portion 230 may at least partially face the hinge housing 140.

In an embodiment, the connecting portion 230 may have a shape extending parallel to the folding axis F. For example, the first cover portion 210 and the second cover portion 220 may be connected to opposite sides of the connecting portion 230 that are perpendicular to the folding axis F.

In an embodiment, the connecting portion 230 may include an inner surface 230b and an outer surface 230a facing away from the inner surface 230b. The inner surface 230b, when viewed in a flat state, may be defined as a surface facing the hinge housing 140 of the electronic device 100. The pen holder 250 may be coupled to the outer surface 230a of the connecting portion 230.

In an embodiment, the connecting portion 230 may include a guide rail 240 to which the pen holder 250 is coupled. For example, the guide rail 240 may be configured to guide a sliding direction S of the pen holder 250 when the pen holder 250 is mounted. For example, the guide rail 240 may be formed on the outer surface 230a of the connecting portion 230. The guide rail 240 may have a shape extending parallel to the folding axis F. For example, the guide rail 240 may extend parallel to the extension direction of the connecting portion 230.

In an embodiment, the pen holder 250 may be coupled to the connecting portion 230 so as to be detachable. The pen holder 250 may extend parallel to the folding axis F. The pen holder 250 may include a protruding portion 251 (refer to FIG. 5) at least partially inserted into the guide rail 240. For example, the protruding portion 251 may extend parallel to the folding axis F.

In an embodiment, a pen 258 may be at least partially accommodated in the pen holder 250. For example, the pen holder 250 may be provided in a shape surrounding at least a portion of the pen 258. Referring to the drawings, a first end portion of the pen 258 may be surrounded by the pen holder 250, and a second end portion of the pen 258 may be exposed to the outside. For example, the first end portion of the pen 258 may include a pen tip.

Figure 5:
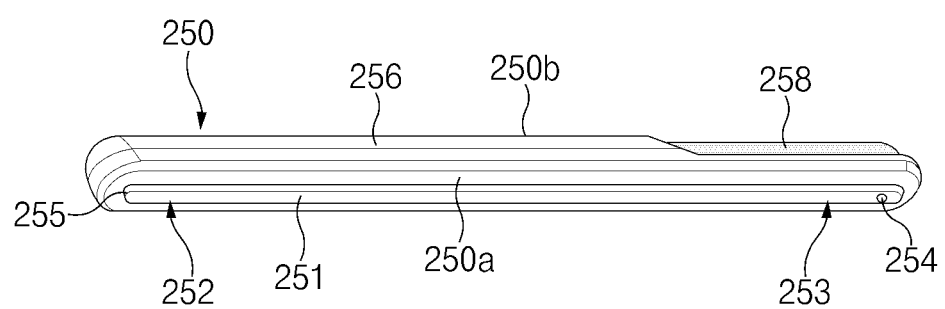
FIG. 5 is a diagram illustrating the pen holder of the cover for the foldable electronic device according to various embodiments.
Figure 6:
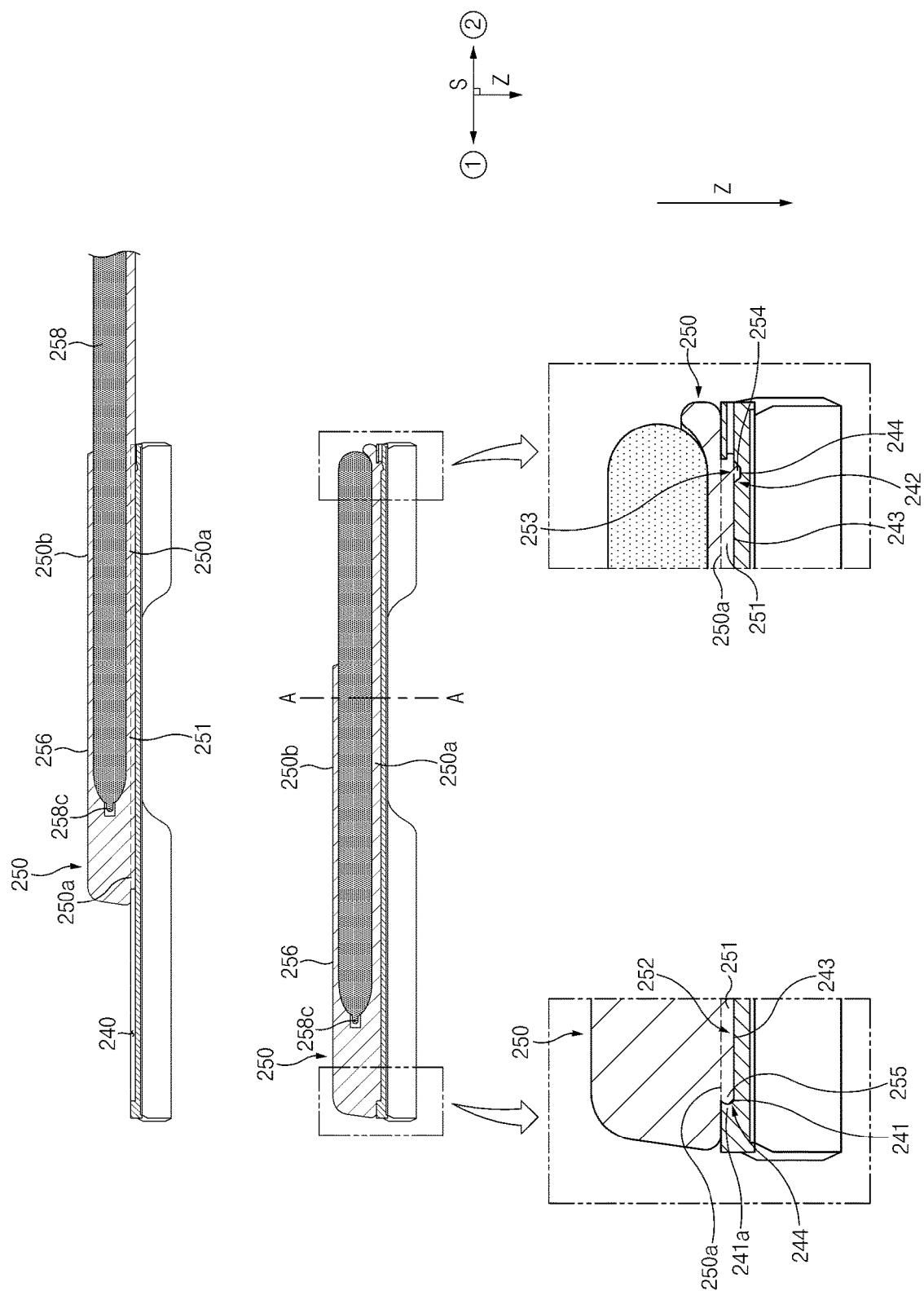
FIG. 6 is a sectional view of the cover for the foldable electronic device according to various embodiments.

FIG. 5 is a diagram illustrating the pen holder of the cover for the foldable electronic device according to various embodiments. FIG. 6 is a sectional view of the cover for the foldable electronic device according to various embodiments.

Hereinafter, the illustrated sliding direction S may refer to the direction in which the pen holder 250 is mounted on, or removed from, the connecting portion 230. For example, the sliding direction S may be parallel to the folding axis F of the electronic device 100. For example, the sliding direction S may be parallel to the y-axis.

Referring to FIG. 5 and FIG. 6, the guide rail 240 may extend in the extension direction of the connecting portion 230 (e.g., the y-axis direction or the direction of the folding axis F). In an embodiment, the guide rail 240 may be provided in a form in which a first end portion 241 is closed and a second end portion 242 is open. The protruding portion 251 of the pen holder 250 may be at least partially accommodated in the guide rail 240. In an embodiment, a second depression 245 may be provided on the guide rail 240. The second depression 245 may be formed in a position adjacent to the second end portion 242 of the guide rail 240. For example, the second depression 245 may be formed in a position corresponding to a fourth end portion 253 of the pen holder 250 in the state in which the pen holder 250 is completely mounted. A second protrusion 255 of the pen holder 250 may be at least partially inserted into the second depression 245.

The pen holder 250 may be inserted into the second end portion 242 of the guide rail 240 and slid in the direction from the second end portion 242 toward the first end portion 241 of the guide rail 240 and thus may be mounted on the connecting portion 230. A first sliding direction S may be defined as a direction in which the pen holder 250 is mounted on the connecting portion 230, and a second sliding direction S may be defined as a direction in which the pen holder 250 is removed from the connecting portion 230.

Referring to FIG. 5, the pen holder 250 may include a holder portion 256 at least partially surrounding the pen 258, the protruding portion 251 formed on the lower surface 250a of the holder portion 256, and a first protrusion 254 and the second protrusion 255 formed on the protruding portion 251.

In an embodiment, the holder portion 256 may include a hollow portion (e.g., a hollow portion 250h of FIG. 12) in which the pen 258 is disposed. The lower surface 250a of the holder portion 256 may have a length corresponding to that of the pen 258, and the upper surface 250b of the holder portion 256 may be shorter than the pen 258. The hollow portion of the holder portion 256 (e.g., the hollow portion 250h of FIG. 12) may be provided in a shape corresponding to the shape of the pen 258. The holder portion 256 may be provided to surround a portion of the pen 258. For example, the portion of the pen 258 may include a pen tip 258c.

In an embodiment, the protruding portion 251 may protrude from the lower surface 250a of the holder portion 256. For example, the protruding portion 251 may protrude in the z-axis direction. The protruding portion 251 may be at least partially accommodated in the guide rail 240. The protruding portion 251 may extend in a direction substantially parallel to the extension direction of the guide rail 240 (e.g., the sliding direction S). The protruding portion 251 may extend a length substantially the same as the extension length of the guide rail 240.

In an embodiment, the third end portion 252 and a fourth end portion 253 may be defined on the protruding portion 251 of the pen holder 250. The third end portion 252 may be defined as a portion corresponding to the first end portion 241 of the guide rail 240 in the state in which the pen holder 250 is completely mounted on the connecting portion 230, and the fourth end portion 253 may be defined as a portion corresponding to the second end portion 242 of the guide rail 240 in the state in which the pen holder 250 is completely mounted on the connecting portion 230.

In an embodiment, the protruding portion 251 may include the second protrusion 255 for hook coupling. For example, the second protrusion 255 may be formed in a position adjacent to the third end portion 252 of the protruding portion 251. The second protrusion 255 may include a portion protruding from the third end portion 252 of the protruding portion 251 in the first sliding direction S. The second protrusion 255 may be at least partially inserted into the second depression 245 formed on the first end portion 241 of the guide rail 240. In an embodiment, the pen holder 250 and the connecting portion 230 may be hook-coupled by insertion of the second protrusion 255 of the protruding portion 251 into the second depression 245 of the guide rail 240.

Referring to FIG. 6, the second depression 245 of the guide rail 240 may be defined by a bottom surface 243 and an inner wall 241a of the first end portion 241 of the guide rail 240. The inner wall 241a of the first end portion 241 of the guide rail 240 may protrude in the second sliding direction S so as to be engaged with the second protrusion 255. In the state in which the pen holder 250 is mounted on the connecting portion 230, the second protrusion 255 may at least partially make contact with at least one of the inner wall 241a or the bottom surface 243. The second protrusion 255, when viewed in the z-axis direction, may overlap a protruding portion of the inner wall 241a of the second depression 245. Accordingly, as the second protrusion 255 is inserted into the second depression 245, the pen holder 250 and the connecting portion 230 may be fixed in the z-axis direction. In an embodiment, as the second protrusion 255 protrudes in the direction parallel to the sliding direction S, the pen holder 250 may be fixed to the connecting portion 230 in the direction perpendicular to the sliding direction (e.g., the z-axis direction).

In an embodiment, the protruding portion 251 may include the first protrusion 254. For example, the first protrusion 254 may be formed in a position adjacent to the fourth end portion 253 of the protruding portion 251. The first protrusion 254 may include a portion protruding from the fourth end portion 253 of the protruding portion 251 in the z-axis direction. The first protrusion 254 may be at least partially inserted into a first depression 244 formed on the second end portion 242 of the guide rail 240. In an embodiment, the pen holder 250 and the connecting portion 230 may be coupled by insertion of the first protrusion 254 of the protruding portion 251 into the first depression 244 of the guide rail 240.

Referring to FIG. 6, the bottom surface 243 of the guide rail 240 may be recessed in the z-axis direction to define the first depression 244 of the guide rail 240. In the state in which the pen holder 250 is mounted on the connecting portion 230, the first protrusion 254 may overlap the first depression 244 when viewed in the sliding direction S. Accordingly, as the first protrusion 254 is inserted into the first depression 244, the pen holder 250 and the connecting portion 230 may be fixed in the sliding direction S. As the first protrusion 254 protrudes in the direction perpendicular to the sliding direction S (e.g., the z-axis direction), the pen holder 250 may be fixed to the connecting portion 230 in the sliding direction S.

Figure 7:
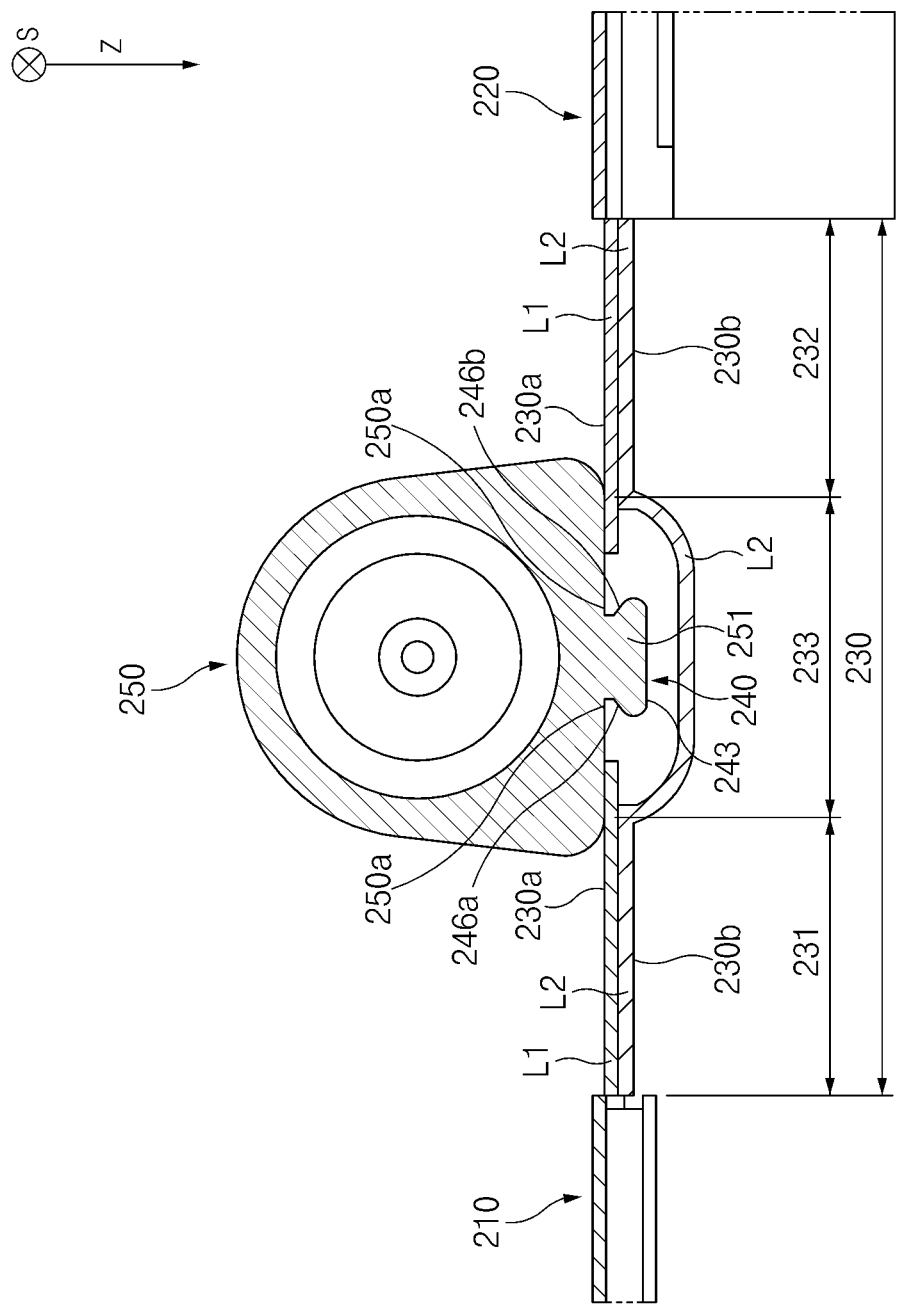
FIG. 7 is a cross-sectional view of the cover for the foldable electronic device according to various embodiments.

FIG. 7 is a cross-sectional view of the cover for the foldable electronic device according to various embodiments. FIG. 7 is a sectional view taken along line A-A of FIG. 6.

Referring to FIG. 7, the connecting portion 230 of the cover 200 may include a central area 233, a first extension area 231, and a second extension area 232.

In an embodiment, the central area 233 may include an area in which the guide rail 240 is located. The central area 233 may be located at the same distance from the first cover portion 210 and the second cover portion 220. One side of the central area 233 may be connected to the first cover portion 210 through the first extension area 231, and an opposite side of the central area 233 may be connected to the second cover portion 220 through the second extension area 232. In an embodiment, the central area 233 may be a rigid area (a non-flexible area). For example, when the first cover portion 210 and the second cover portion 220 are folded or unfolded, the central area 233 may not be bent. In an embodiment, the central area 233 may be formed to be thicker than the first extension area 231 and the second extension area 232.

In an embodiment, the connecting portion 230 may include a plurality of layers. For example, the plurality of layers may include a first layer L1 that forms the outer surface 230a of the connecting portion 230 and a second layer L2 that forms the inner surface 230b of the connecting portion 230. At least a portion of the guide rail 240 may be located between the first layer L1 and the second layer L2. In an embodiment, the guide rail 240 may include an injection-molded polymer material. The guide rail 240 may include a mold. The polymer material may form the bottom surface 243 and inner walls 246a and 246b of the guide rail 240.

In an embodiment, the first extension area 231 may connect the first cover portion 210 and the central area 233. The first extension area 231 may be an at least partially flexible area. For example, when the first cover portion 210 and the second cover portion 220 are folded or unfolded, the first extension area 231 may be bent.

In an embodiment, the second extension area 232 may connect the second cover portion 220 and the central area 233. The second extension area 232 may be an at least partially flexible area. For example, when the first cover portion 210 and the second cover portion 220 are folded or unfolded, the second extension area 232 may be bent.

In an embodiment, the guide rail 240 may have a gradually increasing width in the z-axis direction. Here, the width may be defined in the direction perpendicular to the z-axis direction and the sliding direction S. For example, the width may be defined as the distance between the inner walls 246a and 246b of the guide rail 240 that face each other. For example, the guide rail 240 may be provided such that a portion adjacent to the inner surface 230b of the connecting portion 230 has a first width and a portion adjacent to the outer surface 230a of the connecting portion 230 or the pen holder 250 has a second width smaller than the first width. For example, the inner walls 246a and 246b of the guide rail 240 that face each other may protrude toward each other while getting farther away from the bottom surface 243 or getting closer to the lower surface 250a of the pen holder 250.

In an embodiment, the protruding portion 251 of the pen holder 250, when viewed on the section, may have a shape corresponding to the guide rail 240. For example, the protruding portion 251 may have a gradually increasing width while getting farther away from the lower surface 250a of the pen holder 250. The width may be the distance measured in the direction perpendicular to the z-axis direction and the sliding direction S. Referring to the drawing, when the pen holder 250 is viewed in the −z-axis direction, the protruding portion 251 may at least partially overlap the inner walls 246a and 246b of the guide rail 240. As part of the protruding portion 251 is engaged with the inner walls 246a and 246b of the guide rail 240 as described above, the pen holder 250 is movable in the sliding direction S, but may be constrained to the connecting portion 230 in the z-axis direction.

Figure 8:
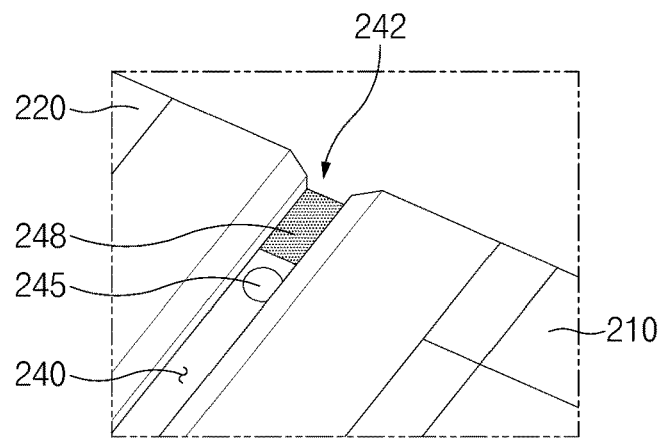
FIG. 8 is a diagram illustrating an example of a guide structure of the cover for the foldable electronic device according to various embodiments.
Figure 8:
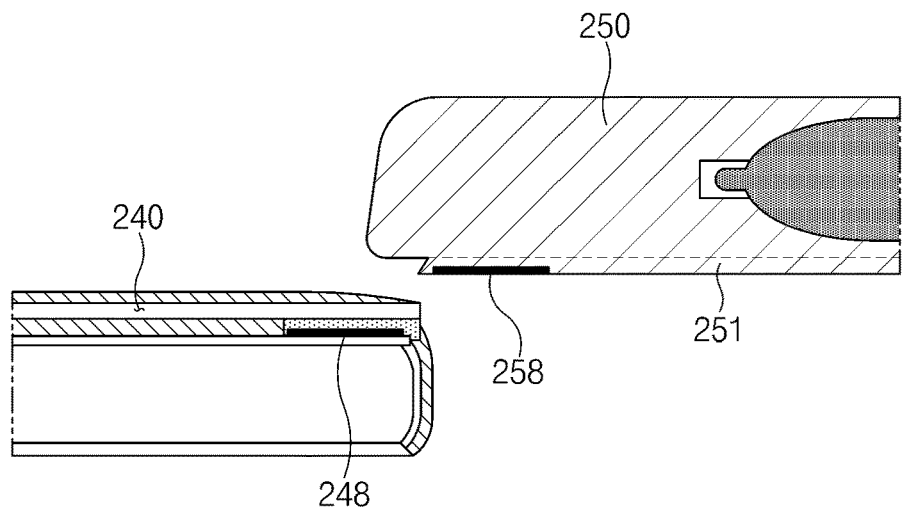
Figure 8:
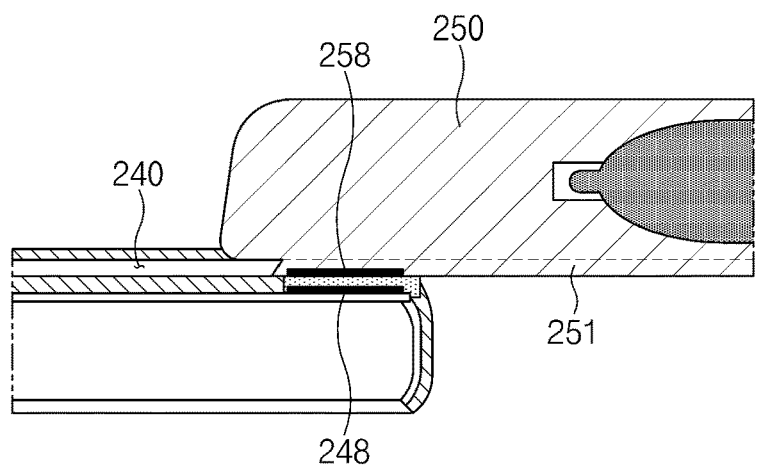
Figure 9:
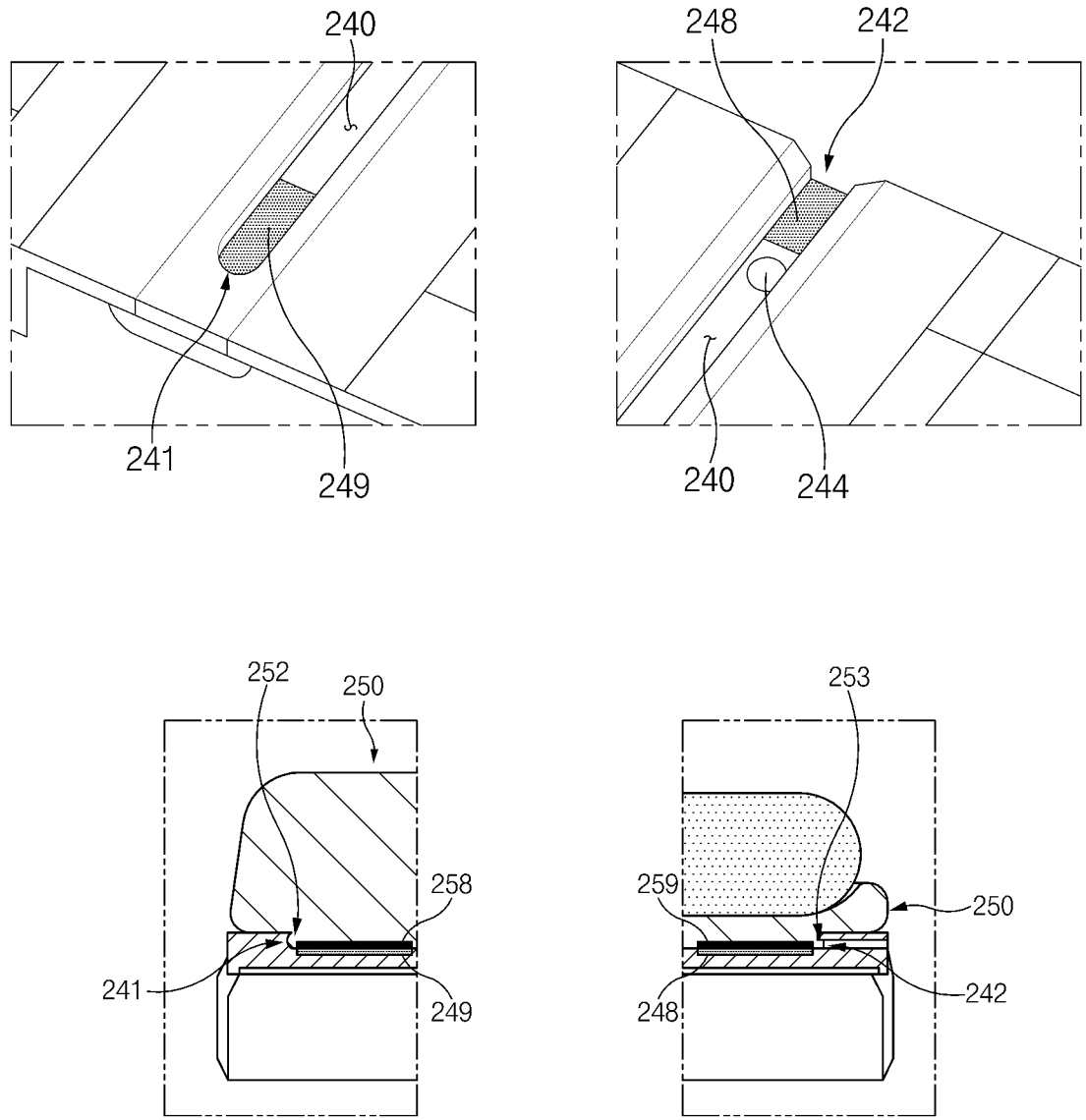
FIG. 9 is a diagram illustrating an example of the guide structure of the cover for the foldable electronic device according to various embodiments.

FIG. 8 is a diagram illustrating an example of a guide structure of the cover for the foldable electronic device according to various embodiments. FIG. 9 is a diagram illustrating an example of the guide structure of the cover for the foldable electronic device according to various embodiments.

Referring FIG. 8 and FIG. 9, in an embodiment, the guide structure may guide the protruding portion 251 of the pen holder 250 such that the protruding portion 251 enters a specified position of the guide rail 240 (e.g., the second end portion 242 of the guide rail 240). For example, through the guide structure, the protruding portion 251 of the pen holder 250 may easily enter the guide rail 240.

In an embodiment, the guide structure may include a first magnet 248 located on the second end portion 242 of the guide rail 240 and a second magnet 258 located on the third end portion 252 of the protruding portion 251 of the pen holder 250. The first magnet 248 and the second magnet 258 may be provided to form an attractive force. For example, the first magnet 248 may be located adjacent to the second depression 245.

In an embodiment, the protruding portion 251 may be located on the open second end portion 242 of the guide rail 240 by the attractive force between the first magnet 248 and the second magnet 258. Accordingly, a user may completely mount the pen holder 250 on the connecting portion 230 by sliding the pen holder 250 with a force greater than the attractive force between the first magnet 248 and the second magnet 258.

In various embodiments, a third magnet 249 may be disposed on the first end portion 241 of the guide rail 240, and a fourth magnet 259 may be disposed on the fourth end portion 253 of the protruding portion 251 of the pen holder 250.

In an embodiment, in an operation of mounting the pen holder 250, the protruding portion 251 of the pen holder 250 may be guided to an entrance position of the guide rail 240 by the attractive force between the first magnet 248 of the guide rail 240 and the second magnet 258 of the pen holder 250.

In the state in which the pen holder 250 is completely mounted, the third magnet 249 of the guide rail 240 may face the second magnet 258 of the pen holder 250, and the first magnet 248 of the guide rail 240 may face the fourth magnet 259 of the pen holder 250. For example, the third magnet 249 may at least partially make contact with the second magnet 258, and the first magnet 248 may at least partially make contact with the fourth magnet 259. The pen holder 250 and the connecting portion 230 may be firmly fixed to each other by the attractive force between the third magnet 249 and the second magnet 258 and the attractive force between the first magnet 248 and the fourth magnet 259.

In the embodiment illustrated in FIG. 9, the first depression 244 of the guide rail 240 and the first protrusion 254 of the pen holder 250 may be omitted, and the function of the first protrusion 254 and the first depression 244 may be replaced with the attractive force between the first magnet 248 and the fourth magnet 259. For example, the second depression 245 of the guide rail 240 and the second protrusion 255 of the pen holder 250 may be omitted, and the function of the second protrusion 255 and the second depression 245 may be replaced with the attractive force between the second magnet 258 and the third magnet 249.

Figure 10:
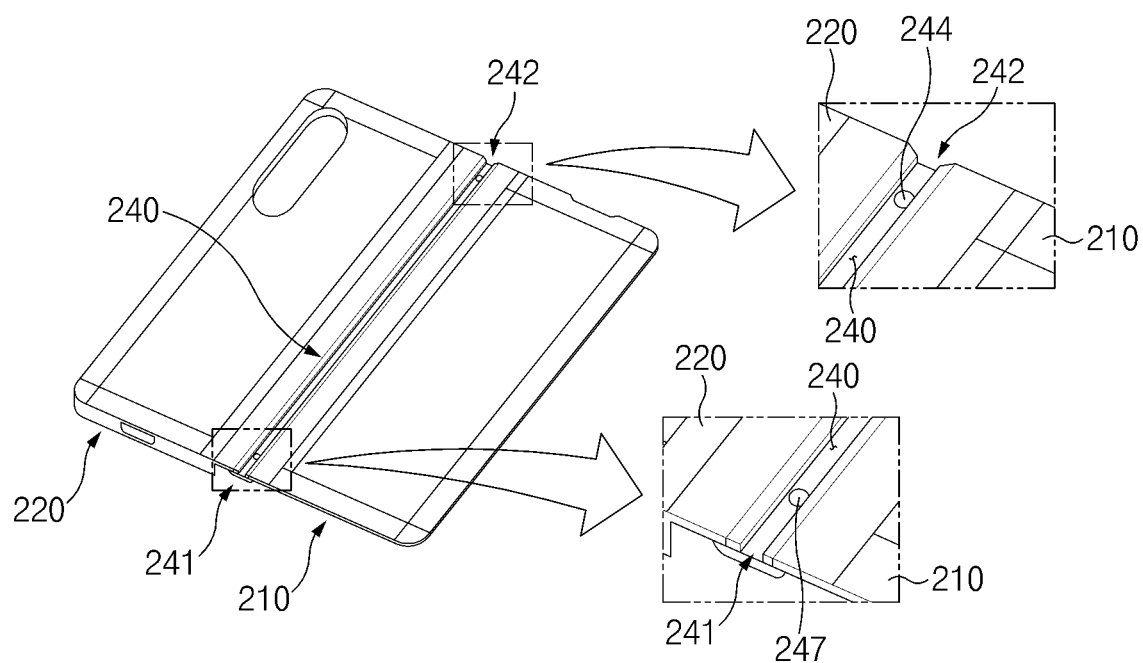
FIG. 10 is a perspective view illustrating a cover for a foldable electronic device according to various embodiments.

FIG. 10 is a perspective view illustrating a cover for a foldable electronic device according to various embodiments.

Referring to FIG. 10, a guide rail 240 may be provided in a form in which opposites sides are open. For example, a pen holder 250 may be mounted on a connecting portion 230 through a first end portion 241 or a second end portion 242 of the guide rail 240. For example, a protruding portion 251 may enter the first end portion 241 of the guide rail 240 and may move in the second sliding direction S, or may enter the second end portion 242 of the guide rail 240 and may move in the first sliding direction S.

The cover 200 illustrated in FIG. 10 may differ from the cover 200 illustrated in FIG. 6 in that the former does not include the second depression 245 of the guide rail 240 and the second protrusion 255 of the pen holder 250. Referring to FIG. 10, to stably mount the pen holder 250, a third depression 247 may be formed on the first end portion 241 of the guide rail 240. Likewise to the first depression 244, the third depression 247 may be recessed in the z-axis direction, and at least a portion of a third protrusion (not illustrated) that is formed on the protruding portion 251 of the pen holder 250 may be inserted into the third depression 247. The third protrusion may be substantially the same as the first protrusion 254, except that the third protrusion is formed on a third end portion 252 of the protruding portion 251 of the pen holder 250. As described above, to stably mount the pen holder 250, the cover 200, in which the pen holder 250 is able to be inserted into the guide rail 240 in the opposite directions, may include the physical coupling structures provided on the opposite end portions of the guide rail 240 and the opposite end portions of the pen holder 250.

Figure 11:
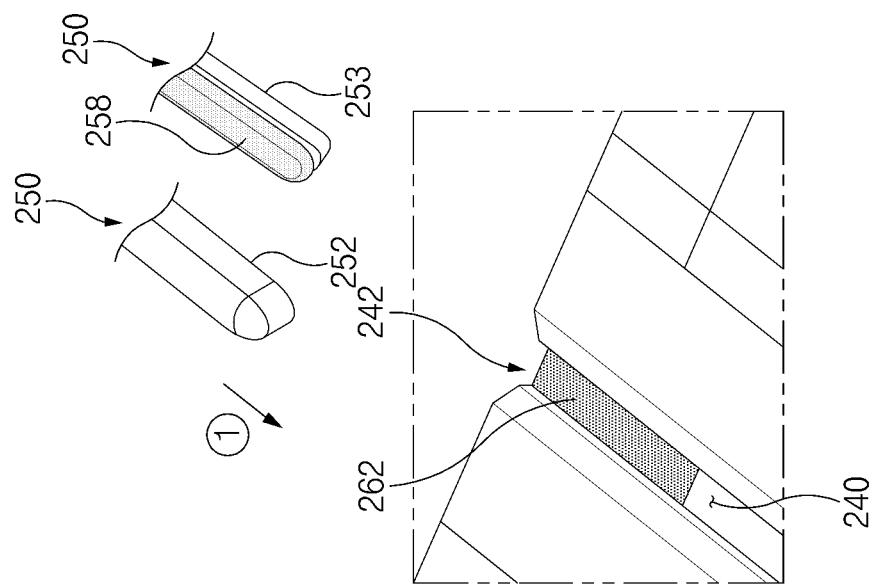
FIG. 11 is a perspective view illustrating a cover for a foldable electronic device according to various embodiments.
Figure 11:
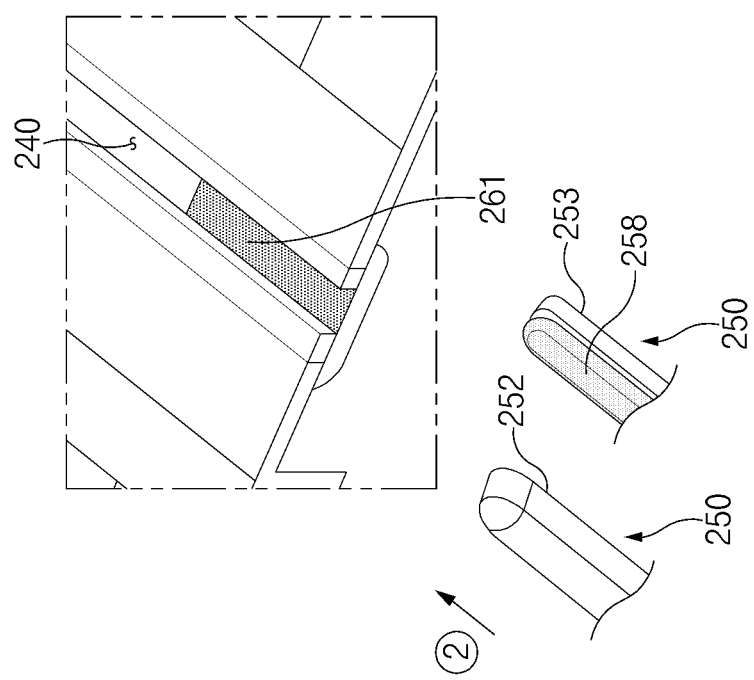

FIG. 11 is a perspective view illustrating a cover for a foldable electronic device according to various embodiments.

The cover 200 illustrated in FIG. 11 may differ from the cover 200 illustrated in FIG. 6 in that the former does not include the first depression 244, the first protrusion 254, the second depression 245, and the second protrusion 255.

Referring to FIG. 11, to stably mount a pen holder 250, the cover 200 may include a coupling structure using magnets. For example, a first magnet 261 may be disposed on a first end portion 241 of a guide rail 240, and a second magnet 262 may be disposed on a second end portion 242 of the guide rail 240.

Referring to FIG. 11, the pen holder 250 may be mounted on a connecting portion in various directions. In various embodiments, a third end portion 252 of a protruding portion 251 of the pen holder 250 may enter the second end portion 242 of the guide rail 240 and may be inserted into the guide rail 240 in the first sliding direction S. In various embodiments, a fourth end portion 253 of the protruding portion 251 of the pen holder 250 may enter the second end portion 242 of the guide rail 240 and may be inserted into the guide rail 240 in the first sliding direction S. In various embodiments, the third end portion 252 of the protruding portion 251 of the pen holder 250 may enter the first end portion 241 of the guide rail 240 and may be inserted into the guide rail 240 in the second sliding direction S. In various embodiments, the fourth end portion 253 of the protruding portion 251 of the pen holder 250 may enter the first end portion 241 of the guide rail 240 and may be inserted into the guide rail 240 in the second sliding direction S.

In various embodiments, the pen holder 250 may include a third magnet (not illustrated) that corresponds to the first magnet 261 of the guide rail 240 in a completely mounted state and a fourth magnet (not illustrated) that corresponds to the second magnet 262 of the guide rail 240 in the completely mounted state. For example, the third magnet may be located on the third end portion 252 of the pen holder 250, and the fourth magnet may be located on the fourth end portion 253 of the pen holder 250.

In various embodiments, the corresponding magnets may form an attractive force. The pen holder 250 and the connecting portion may be stably fixed to each other by the attractive force of the corresponding magnets.

In various embodiments, one of the two magnets 261 and 262 included in the guide rail 240 may guide one of the two magnets included in the pen holder 250 (e.g., the second magnet 258 and the fourth magnet 259 of FIG. 9).

Figure 12:
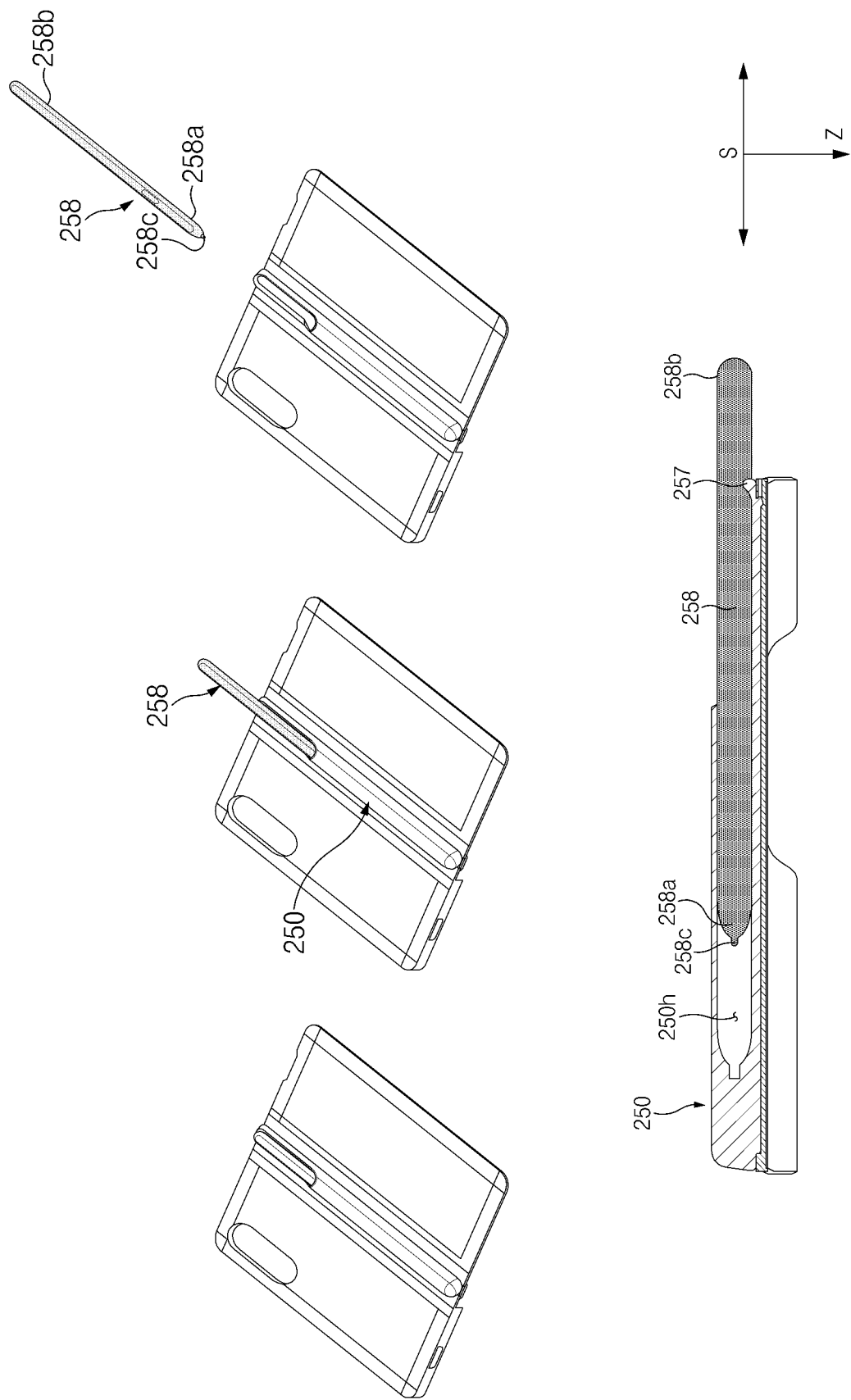
FIG. 12 is a perspective and sectional view illustrating attachment and detachment of a pen to and from a cover for a foldable electronic device according to various embodiments.

FIG. 12 is a perspective view illustrating attachment and detachment of a pen to and from a cover for a foldable electronic device according to various embodiments.

Referring to FIG. 12, the pen 258 may be configured to be detachable from a pen holder 250. A first end portion 258a of the pen 258 that includes a pen tip 258c may be located in the pen holder 250 to protect the pen tip 258c in the state in which the pen 258 is mounted. The remaining portion of the pen 258 (e.g., a second end portion 258b of the pen 258) may be exposed outside the pen holder 250. A user may remove the pen 258 from the pen holder 250 by holding and pulling the remaining portion.

In an embodiment, the pen holder 250 may include a second protruding portion 257 at least partially surrounding the second end portion 258b of the pen 258 in the state in which the pen 258 is mounted. The second protruding portion 257 may be provided in a curved shape along the second end portion 258b of the pen 258. The second protruding portion 257 may protrude from the lower surface of the pen holder 250 in the −z-axis direction. In an embodiment, the second protruding portion 257 may make contact with the pen 258 in a process of attaching and detaching the pen 258. The pen 258 may be attached and detached in a direction inclined at a predetermined angle with respect to the sliding direction S. Accordingly, the second protruding portion 257 of the pen holder 250 may constrain the pen 258 in the sliding direction S such that the pen is not separated from the inside of the pen holder. For example, in the state in which the pen 258 is mounted, the second protruding portion 257 may partially overlap the pen 258 when viewed in the sliding direction S.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., internal memory or external memory) that is readable by a machine (e.g., an electronic device). For example, a processor of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A cover for an electronic device, the cover comprising: a first cover portion configured to be coupled to a first housing of the electronic device; a second cover portion configured to be coupled to a second housing of the electronic device; a connecting portion provided between the first cover portion and the second cover portion and extending in a first direction, wherein the connecting portion is configured such that the first cover portion and the second cover portion are superimposed on each other when folded or are unfolded; a pen holder configured to at least partially accommodate a pen and mounted on the connecting portion to be detachable; wherein the pen holder is configured to be mounted on the connecting portion by sliding in the first direction; and wherein the connecting portion includes a guide rail extending in the first direction, and wherein the pen holder includes a protruding portion at least partially accommodated in the guide rail.

2. The cover of claim 1, wherein the first cover portion and the second cover portion are configured to be folded or unfolded with a folding axis parallel to the first direction therebetween as the connecting portion is bent.

3. The cover of claim 1, wherein the pen holder further includes a holder portion configured to surround at least a portion of the pen, and wherein the protruding portion is formed on a surface of the holder portion.

4. The cover of claim 1, wherein the guide rail includes a closed first end portion and an open second end portion, and wherein the pen holder is configured to be mounted on the connecting portion as a third end portion of the protruding portion enters the second end portion of the guide rail and slides toward the first end portion of the guide rail.

5. The cover of claim 4, wherein the protruding portion includes a second protrusion protruding from the third end portion in the first direction, and
    wherein the guide rail includes, on the first end portion, a second depression at least partially accommodating the second protrusion.

6. The cover of claim 5, wherein the second depression is defined by a bottom surface and an inner wall of the guide rail, and
    wherein at least a portion of the second protrusion is located between the inner wall and the bottom surface based on the pen holder being completely mounted on the connecting portion.

7. The cover of claim 6, wherein the first cover portion and the second cover portion are connected with the connecting portion in a second direction perpendicular to the first direction based on the first cover portion and the second cover portion being unfolded, and
    wherein the second protrusion at least partially overlaps the inner wall when the bottom surface of the guide rail is viewed in a third direction perpendicular to the first direction and the second direction.

8. The cover of claim 7, wherein the pen holder is fixed to the connecting portion in the third direction by the second protrusion and the second depression based on the pen holder being completely mounted on the connecting portion.

9. The cover of claim 4, wherein the guide rail includes a first depression formed on a bottom surface thereof, and
    wherein the protruding portion includes a first protrusion at least partially accommodated in the first depression based on the pen holder being completely mounted on the connecting portion.

10. The cover of claim 9, wherein the first depression is adjacent to the second end portion of the guide rail.

11. The cover of claim 9, wherein the pen holder is fixed to the connecting portion in the first direction by the first protrusion and the first depression based on the pen holder being completely mounted on the connecting portion.

12. The cover of claim 4, wherein a first magnet is disposed on the guide rail, and
    wherein a second magnet configured to form an attractive force with the first magnet disposed on the protruding portion of the pen holder.

13. The cover of claim 12, wherein the first magnet is located on the open second end portion of the guide rail,
    wherein the second magnet is located on one end portion of the pen holder, and
    wherein the first magnet and the second magnet are configured to guide the pen holder to the open second end portion of the guide rail based on the pen holder being mounted on the connecting portion.

14. The cover of claim 1, wherein the pen holder includes a holder portion configured to surround a portion of the pen, and
    wherein the portion of the pen includes a first end portion on which a pen tip is located.

15. The cover of claim 14, wherein the holder portion of the pen holder includes a fixing portion configured to at least partially surround a second end portion of the pen based on the pen being completely mounted in the pen holder, and
    wherein the pen is configured to be mounted in the pen holder by moving in a direction inclined with respect to the first direction by the fixing portion.

16. The cover of claim 1, wherein the connecting portion includes a central area on which the pen holder is mounted, a first extension area extending from the central area to the first cover portion, and a second extension area extending from the central area to the second cover portion, and
    wherein the first extension area and the second extension area have a substantially same extension length.

17. The cover of claim 16, wherein the central area comprises a rigid area, and
    wherein each of the first extension area and the second extension area includes a flexible area deformable based on on a folding or unfolding motion of the electronic device.

18. The cover of claim 16, wherein the connecting portion includes an inner surface configured to face a hinge housing of the electronic device in a folded state based on first cover portion and the second cover portion being superimposed on each other and an outer surface configured to face away from the inner surface, and wherein the pen holder is mounted on the outer surface.

* * * * *